US007149992B2

(12) United States Patent
Chang et al.

(10) Patent No.: US 7,149,992 B2
(45) Date of Patent: Dec. 12, 2006

(54) METHOD FOR FASTER TIMING CLOSURE AND BETTER QUALITY OF RESULTS IN IC PHYSICAL DESIGN

(75) Inventors: Xin Chang, Fremont, CA (US); Penny Wang, Fremont, CA (US); Shuming Chuang, Fremont, CA (US)

(73) Assignee: Via Technologies, Inc. (TW)

( * ) Notice: Subject to any disclaimer, the term of this patent is extended or adjusted under 35 U.S.C. 154(b) by 100 days.

(21) Appl. No.: 10/669,496

(22) Filed: Sep. 23, 2003

(65) Prior Publication Data
US 2004/0111686 A1 Jun. 10, 2004

Related U.S. Application Data

(60) Provisional application No. 60/420,880, filed on Oct. 23, 2002.

(51) Int. Cl.
G06F 17/50 (2006.01)
(52) U.S. Cl. .............................................. 716/6; 716/2
(58) Field of Classification Search ................ 716/2–6, 716/7–8
See application file for complete search history.

(56) References Cited

U.S. PATENT DOCUMENTS

| | | | | |
|---|---|---|---|---|
| 5,963,728 A | * | 10/1999 | Hathaway et al. ............. | 716/3 |
| 6,099,584 A | * | 8/2000 | Arnold et al. ................ | 716/19 |
| 6,189,131 B1 | * | 2/2001 | Graef et al. .................... | 716/8 |
| 6,523,155 B1 | * | 2/2003 | Ruedinger ....................... | 716/7 |
| 6,550,044 B1 | * | 4/2003 | Pavisic et al. .................. | 716/6 |
| 6,745,371 B1 | * | 6/2004 | Konstadinidis et al. ........ | 716/2 |
| 6,766,504 B1 | * | 7/2004 | Rahut et al. ................... | 716/13 |
| 6,910,200 B1 | * | 6/2005 | Aubel et al. .................... | 716/9 |

FOREIGN PATENT DOCUMENTS

CN 1143860 A 2/1997

OTHER PUBLICATIONS

CN 1143860A, Derwent record and abstract, Feb. 26, 1997.

* cited by examiner

*Primary Examiner*—Vuthe Siek
(74) *Attorney, Agent, or Firm*—Anthony B. Diepenbrock, III; Dechert LLP

(57) ABSTRACT

A selective IPO procedure based on the concept of a "timing violation potential" prioritizes the components and nets in a critical path. User input criteria is used to select the components or nets (or both) which have the larger "timing violation potential;" only those components and nets are then operated on. After a selective IPO step, the total number of critical paths is reduced, as well as the worst negative slacks (WNS) of the critical path compared to the traditional IPO method.

4 Claims, 7 Drawing Sheets

Capacitance Violation File

| # InstPin | MaxCap | Cap | CapSlack | CellPort |
|---|---|---|---|---|
| i_meu/ibiu_i_inst/U1217/Y | 0.171 | 0.898 | -0.727 | BUFX2TH/Y |
| i_meu/miu_i_inst/U6094/Y | 1.024 | 1.743 | -0.719 | BUFX12TH/Y |
| i_meu/U1/Y | 0.085 | 0.796 | -0.711 | INVX1TH/Y |
| i_meu/biu_i_inst/U1215/Y | 0.341 | 1.042 | -0.701 | BUFX4TH/Y |
| i_meu/biu_i_inst/U1230/Y | 0.171 | 0.870 | -0.699 | BUFX2TH/Y |
| i_meu/biu_i_inst/U1207/Y | 0.341 | 1.039 | -0.698 | BUFX4TH/Y |

FIG. 5A

Transition timing report

| # InstPin | MaxTranTime | TranTime | TranSlack | CellPort |
|---|---|---|---|---|
| i_bci/u_bcif/U416/A | 1.500 | 11.272r/6.066f | -9.772r/-4.566f | NAND2X1TH/A |
| i_meu/U1/Y | 1.500 | 11.272r/6.066f | -9.772r/-4.566f | INVX1TH/Y |
| i_bci/u_parsch/U1046/A0 | 1.500 | 11.272r/6.066f | -9.772r/-4.566f | AO22X1TH/A0 |
| i_reg_cntrl/U29/Y | 1.500 | 11.003r/4.024f | -9.503r/-2.524f | NOR2BX1TH/Y |
| i_reg_cntrl/TIME/D1 | 1.500 | 11.003r/4.024f | -9.503r/-2.524f | SMDFFHQX1TH/D1 |
| i_reg_cntrl/FSM/U12/Y | 1.500 | 10.955r/4.010f | -9.455r/-2.510f | NOR2X1TH/Y |
| i_bci/mio_read/U351/Y | 1.500 | 10.628r/2.944f | -9.128r/-1.444f | NOR4X1TH/Y |

FIG. 5B

Critical Net report i_vs/i_alu/i_source_sel/SPCDPN13319_n2584
i_vs/i_alu/i_source_sel/SPCDPN13318_n2647
i_vs/i_alu/i_source_sel/SPCDPN13317_n2549
i_vs/i_alu/i_source_sel/SPCDPN13316_n2547
i_vs/i_alu/i_vector_even/i_muladd_vec/SPCDPN13310_n38174
i_thiu/TIS_FFCTL/SPCDPN13292_n455
i_vs/i_alu/i_source_sel/SPCDPN13268_n4692
i_thiu/PROC_2D/U_th_2d_img_seq/SPCDPN13263_n5244

FIG. 5C

Timing Analysis report file

```
Object name
     Delta r/f (ns)   Sum r/f (ns)      Slew (ns)     Load (pf)   Cell Location (um)
  INST1 CK->Q (SDFFRHQX8TH)
     0.320f/0.346r   0.320f/0.346r     0.120f/0.120r  0.110       (1291.22, 1380.06)
  INST2 A->Y (BUFX20TH)
     0.208f/0.235r   0.529f/0.582r     0.190f/0.210r  0.426       (1293.52, 1376.37)
  INST3 B->Y (NAND2X4TH)
     0.099r/0.089f   0.632r/0.675f     0.230f/0.313r  0.005       (1259.94, 1372.68)
```

FIG. 5D

Selective IPO Netfile

```
i_vs/i_alu/i_source_sel/n4132 i_vs/i_alu/i_source_sel/n4063 i_vs/i_alu/i1_seta/SPCDPN4239_x0_odd_18_ i_vs/i_alu/i_source_sel/n4092 i_vs/i_alu/i0_float_fix/n53 i_vs/i_alu/n1447 i_vs/i_alu/n1448
```

FIG. 5E

IPO command file

```
genIPONets $CellDelay $OutputTransition $NetCap
setIPOMode -mediumEffort -noFixDrc -addPortAsNeeded -noPreserveRoute \
-targetSlack 0 -maxDensity 0.90 -selHInst {} -excHInst {}
optFanout -selNetFile .netFile
trialRoute
extractRC
updateTimingGraph genIPONets $CellDelay $OutputTransition $NetCap
setAnalysisMode -setup -async -noSkew -autoDetectClockTree
updateTimingGraph setIPOMode -mediumEffort -noFixDrc -addPortAsNeeded -noPreserveRoute \
-targetSlack 0 -maxDensity 0.90 -selHInst {} -excHInst {}
initECO
updateTimingGraph isTimingMet -fast -targetSlack 0.0
setIPOMode -preserveRoute
downsize -selNetFile .netFile
resize -selNetFile .netFile
setIPOMode -noPreserveRoute
extractRC
updateTimingGraph isTimingMet -fast -targetSlack 0.0
optFanout -selNetFile .netFile
trialRoute
extractRC
updateTimingGraph isTimingMet -fast -targetSlack 0.0
upsize -selNetFile .netFile
trialRoute
extractRC
updateTimingGraph cleanupECO
savedesign $my_design.enc
```

FIG. 6

METHOD FOR FASTER TIMING CLOSURE AND BETTER QUALITY OF RESULTS IN IC PHYSICAL DESIGN

CROSS-REFERENCE TO RELATED APPLICATIONS

This application claims priority to and hereby incorporates by reference the U.S. provisional patent application Ser. No. 60/420,880, entitled "METHOD FOR FASTER TIMING CLOSURE AND BETTER QUALITY OF RESULTS IN IC PHYSICAL DESIGN," and filed on Oct. 23, 2002.

FIELD OF THE INVENTION

The present invention relates generally to IC design and more particularly to selective IPO for faster timing closure and better quality of results in the physical design of integrated circuits.

DESCRIPTION OF THE RELATED ART

Commercial Electronic Design Automation (EDA) software provides an In-Place Optimization (IPO) feature which performs sizing, buffer/inverter insertion, and the splitting of net (interconnect) loads in order to fix timing problems in critical paths. However, this software has some limitations. The software operates on all of the critical paths, and involves too many elements and possibilities. This usually results in long run time, sub-optimal design, large layout areas, as well as creating more congestion problems after IPO.

FIG. 1 shows a typical flow chart 100 for a conventional IPO process. In operation, the EDA software receives the desired circuit design in the form of a netlist (a description of the logic components and their connections), including all the components making up the circuit and their interconnections. In the placement step 102, the EDA software translates the netlist into a physical layout of the components and nets (interconnects). This preliminary placement of the design seldom yields an optimal layout. Therefore, in step 104, a timing analysis of the circuit is performed to check the proper functioning of each and every path and net within the IC. The output of the timing analysis is a report identifying critical paths with timing problems.

The result of the timing analysis is evaluated in operation 106, where paths with timing violations are selected for In Place Optimization (IPO), in step 108. After the IPO process is performed, the EDA software performs a routing process, in operation 110.

The conventional IPO process performs In Place Optimization (resize, split load, insert buffer/inverter, design rule fix) for the whole sets of critical paths. As long as a path violates timing, the tool identifies this path as a critical path, everything in this path is considered critical and the tool works on all components and nets of the whole sets of critical paths of the design at the same time, treating them all the same, i.e., as equally critical. Thus, existing IPO tools have limitations. They involve too many elements and possibilities for the whole critical path sets. This usually results in long run time, sub-optimal design, increased layout areas, as well as creates more congestion problems after IPO. Within the conventional process there is no concept regarding which components or nets can be fixed first to get the best improvement in timing. What is needed is a process which has shorter run times, has more optimal design, improved timing, a smaller increase in layout area and fewer congestion problems.

BRIEF SUMMARY OF THE INVENTION

The present invention is directed towards the above need. The selective IPO procedure of the present invention introduces the concept of a "timing violation potential" to prioritize the components and nets (interconnects) in a critical path. According to the invention, user input criteria is used to select the components or nets (or both) which have the larger "timing violation potential;" only those components and nets are then operated on. After a selective IPO step, the total number of critical paths is reduced, as well as the worst negative slacks (WNS) of the critical path compared to the traditional IPO method. This provides better quality of results-smaller area usage, a smaller congestion problem, better timing, and faster run time (Better QOR). Much faster run time results because the software deals with a lot fewer objects. Timing improvement results because the largest timing violations are guaranteed to be removed or reduced. More overall timing improvement occurs because many other timing violation paths are easily fixed by working on the most critical nets only. A smaller increase in cell area, less congestion in the routing of the design, and faster timing closure (which shortens the design period) also result.

A method in accordance with the present invention is a method of resolving timing violations in a network of components and interconnects for a physical design of an integrated circuit. The method includes the steps of performing a timing analysis on the network, where one or more components or interconnects of the network each has a particular amount of timing violation potential, and performing a selective in-place optimization by identifying components or interconnects of the network that have the highest amount of timing violation potential and executing an in place optimization according to the identified components or interconnects. The step of performing a selective in-place optimization includes obtaining user-provided criteria, where the criteria include cell delay, transition times, net cap (inter-connect capacitance) and interconnect delays. Timing, transition, cap (capacitance) violation data, RC information and critical nets for the entire design are generated in a set of reports and the reports are scanned. Clock nets from the selection list and removed and logic operations are performed to select components or nets or both with the greatest amount of timing violation potential based on the user-provided criteria. Finally, an in-place optimization with only the selected components or nets or both is performed.

BRIEF DESCRIPTION OF THE DRAWINGS

These and other features, aspects and advantages of the present invention will become better understood with regard to the following description, appended claim, and accompanying drawings where:

FIG. 5A shows an exemplary capacitance violation file;

FIG. 5B shows an exemplary transition timing report;
FIG. 5C shows an exemplary critical net report;
FIG. 5D shows an exemplary timing analysis report file;
FIG. 5E shows an exemplary selective IPO Netfile; and
FIG. 6 shows an exemplary IPO command file.

DETAILED DESCRIPTION OF THE INVENTION

During the IPO process, a method in accordance with the present invention helps solve various types of problems: long run-time for each run, increased layout area, increased congestion, insignificant timing improvement, and a long design period caused by the previous problems. The invention solves above problems by employing the concept of "timing violation potential," to aid in the selection components or nets (interconnects) or both with the largest violation potential by using user input criteria and then running an IPO only for the selected components or nets. Although a timing analyzer reports critical paths, not everything in the critical path can get the same amount of improvement. Some components or nets have a greater potential to improve timing than others. The concept of "timing violation potential" is used to characterize each component or net (interconnect). If the component or net has a larger timing violation potential, then it can cause larger timing violations, and if these are operated on first, it is more likely to result in the largest timing improvement. For the rest of the components or nets, even if they are still in critical path, operating on them may not achieve any more timing improvement, so these nets are removed from the critical component or nets list of the critical path. Clock nets sometimes cause very big transition and cap (capacitance) violations, but they are solved by clock tree synthesis, so the clock nets are removed from consideration. After dealing with the components or nets with the largest timing violation potential, the Worst Negative Slack (WNS) of critical path is greatly reduced, and in the mean time, the critical path, which may have only small timing violations, may have received enough timing improvement to become a non-critical path. So this selective IPO will also reduce total number of critical paths as well as Total Negative Slack (TNS) of the design. Because less than 10% of all components or nets (or both) in the critical path are operated on, there is a run-time and memory usage advantage. For the same reason, the IPO tool does not have to size up too many cells, and does not have to insert too many buffer or inverters or split too many nodes to get the same amount of timing improvement, so the selective IPO approach has a smaller increase in circuit area, and a smaller congestion problem after IPO. In high density UDSM physical design, this approach achieves faster timing closure and better timing improvements.

Figure 1:
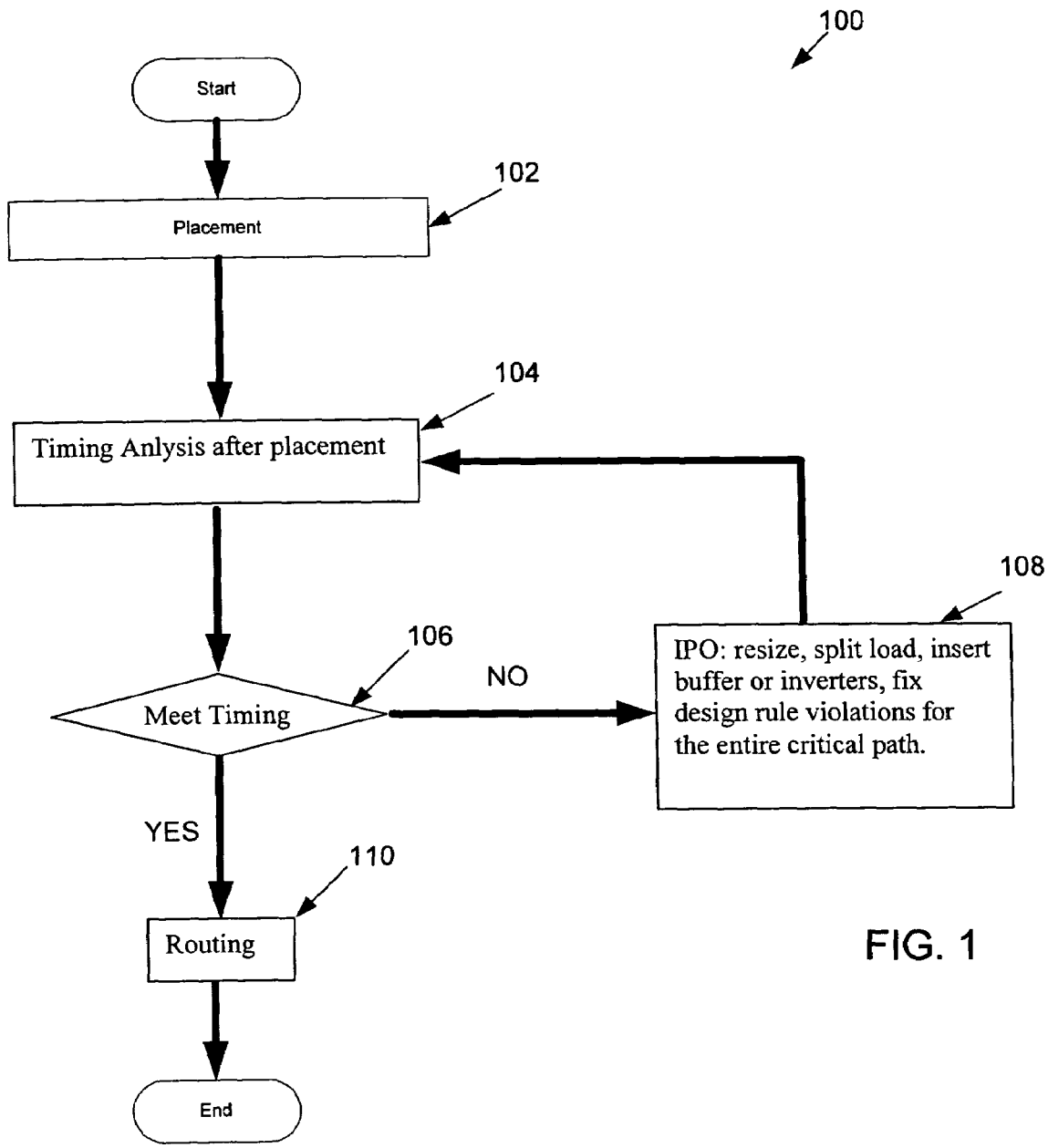
FIG. 1 shows a typical flow chart for a conventional IPO process.
Figure 2:
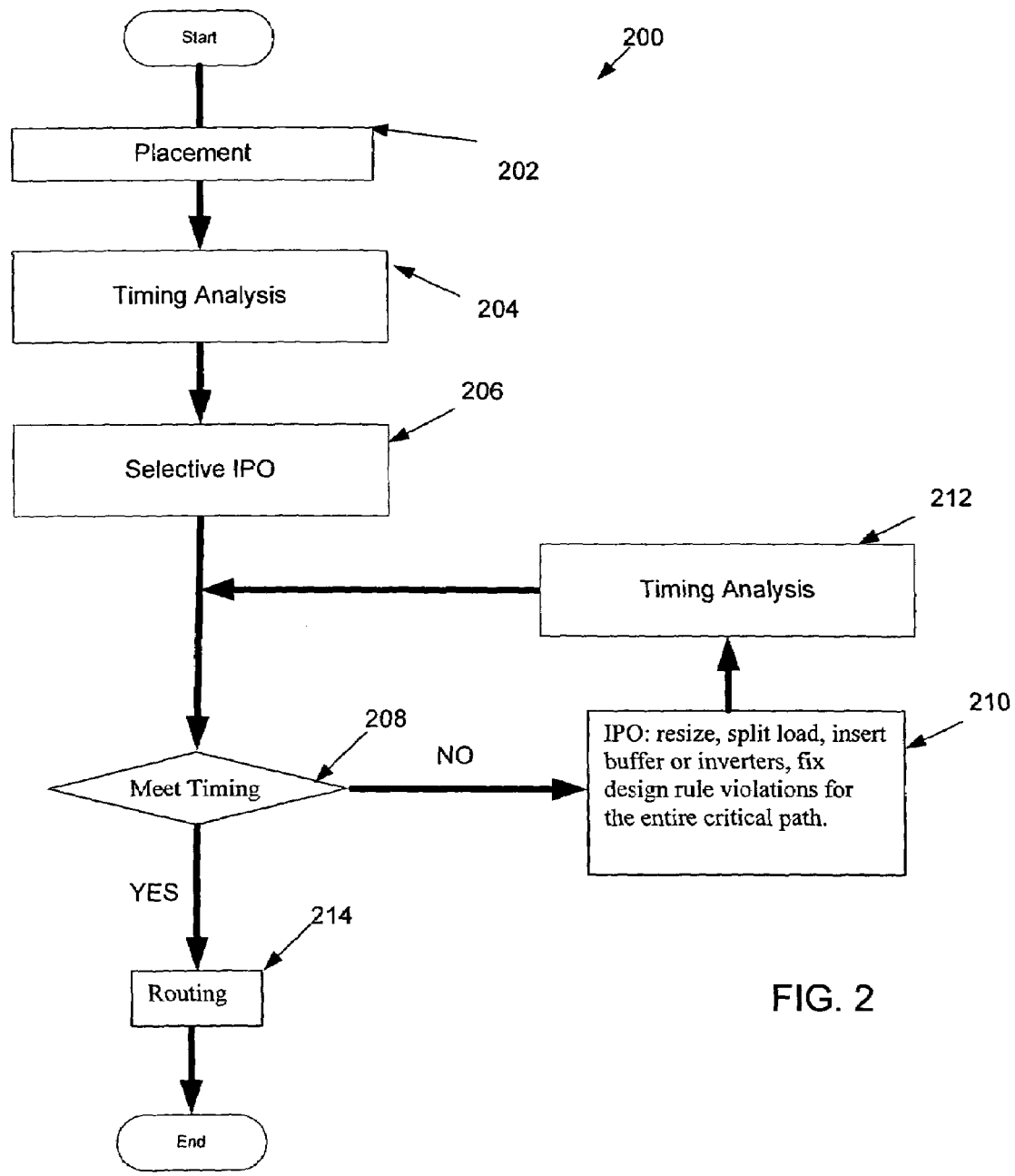
FIG. 2 shows a flow chart of an embodiment of the present invention.

FIG. 2 shows a flow chart 200 of an embodiment of the present invention, which includes a placement step 202, a timing analysis step 204, a selective IPO step 206, a timing evaluation step 208, an IPO step 210, a second timing analysis 212, and a routing step 214. In step 202, the EDA software lays out the circuit based on the netlist (a description of the logic components and their connections) that includes a list of all the components and interconnections that comprise the device. An initial timing analysis is performed in step 204, indicating critical paths and nets failing the timing constraints.

In one embodiment of the present invention, the results of the timing analysis may be stored in a timing analysis report file such as the one shown in FIG. 5D.

At the selective IPO step 206, paths and nets with the highest "timing violation potential" are addressed first, and their impact on the circuit performance is recorded. After the selective IPO step 206, a determination is made as to whether the timing criteria are met in step 208. If so, routing occurs in step 214. If not, a loop is entered which includes an IPO step 210 and a timing analysis step 212. After each pass through the loop, the timing is checked again in step 208, and if timing is met, routing 214 occurs.

Figure 3:
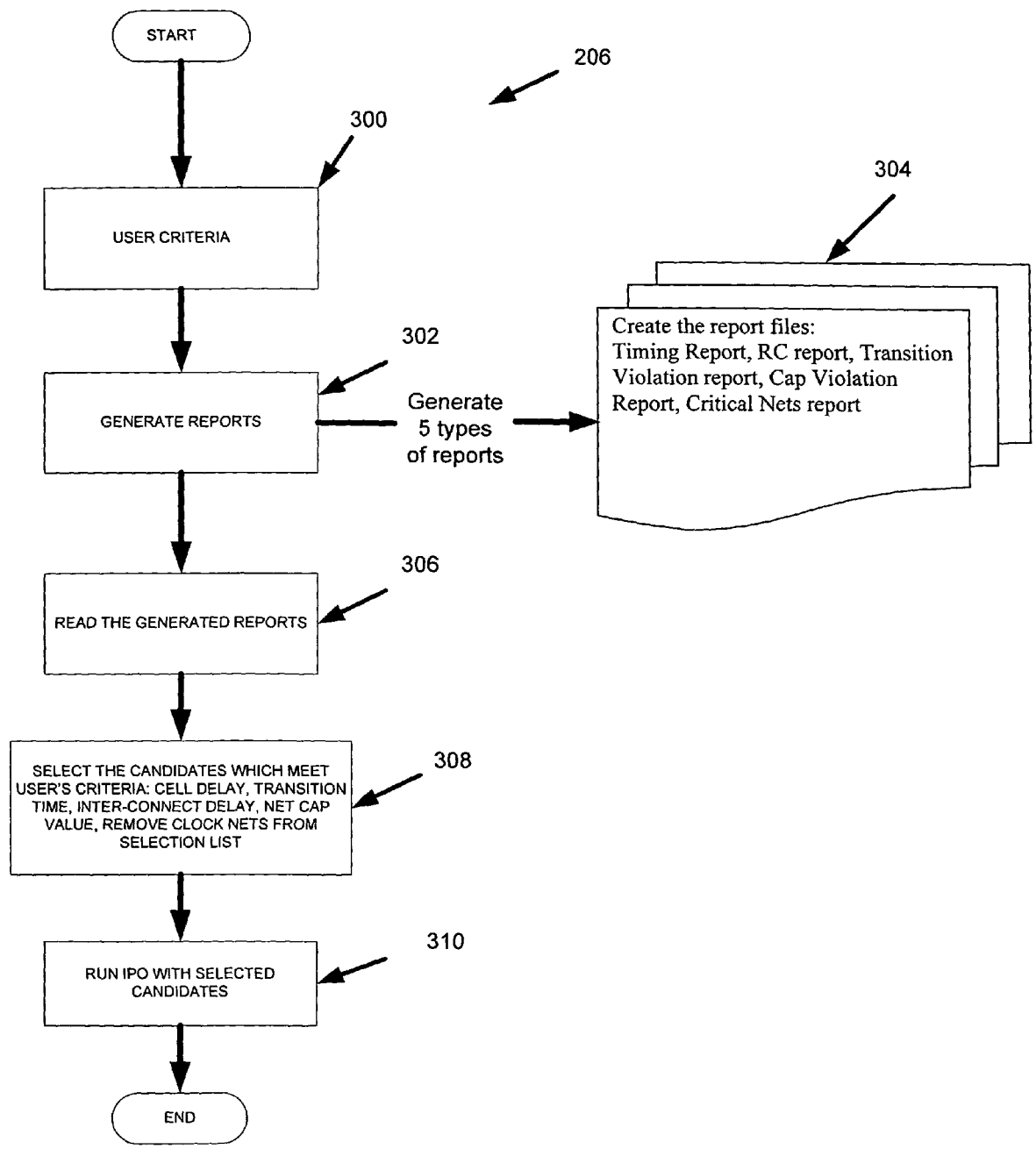
FIG. 3 shows a flow chart of the selective IPO function in accordance with an embodiment of the present invention.

FIG. 3 shows a flow chart of the selective IPO step 206, in accordance with an embodiment of the present invention, which includes (i) a report generation step 302 for generating timing, transition, cap violation data as well as RC information and critical nets for the entire design, the reports being labeled as 304; (ii) a parser step 306 for reading the generated reports; (iii) a smart Selection/Filter step 308 for removing clock nets from selection list, and for performing logic operations to select the components or nets (or both) with the higher violation potential that meet user-provided criteria to work, where the criteria include cell delay, transition time, net cap (interconnect capacitance), and interconnect delay; and (iv) an execution unit step 310 to run IPO with only the selected candidates.

The selective IPO operation 206 begins with receiving user criteria in step 300. The user inputted criteria are used in the determination of the critical paths and nets with the highest "timing violation potential." The user criteria may include values for cell delay, transition time, inter-connect delay, net capacitance value (net cap value), and removal of clock nets from the selection list.

In step 302, various reports 304 including timing reports, RC report, transition violation report, cap violation report and critical nets report are generated. FIGS. 5A, 5B and 5C show exemplary cap violation, timing violation and critical net reports.

In step 306, the generated reports are parsed for the selective IPO process. In step 308, the candidates which meet the user inputted criteria are selected. Finally, in step 310, also referred to as the execution stage, an IPO run is performed with the selected, filtered candidates, based on the user criteria.

After a selective IPO step, the total number of critical paths is reduced, as well as the worst negative slacks (WNS) of the critical path compared to the traditional IPO method. This provides better quality of results: a smaller area usage, a smaller congestion problem, better timing, and faster run time (Better QOR). Much faster run time results because the software deals with fewer objects. Timing improvement results because the largest timing violations are removed. More overall timing improvement occurs because many other timing violation paths are easily fixed by working on the most critical nets only. A smaller increase in cell area, less congestion in the routing of the design, and faster timing closure (which shortens the design period) also result.

Figure 4:
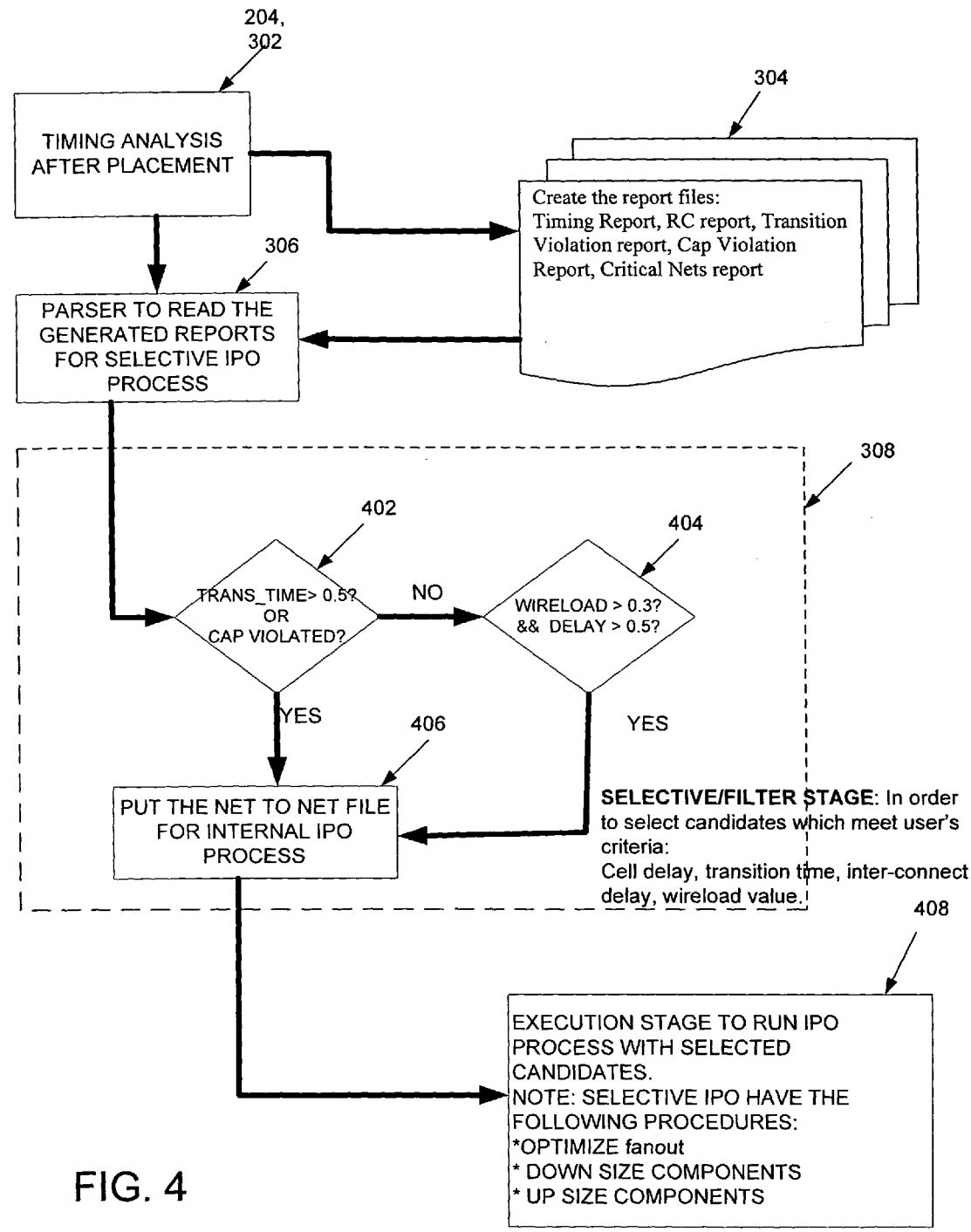
FIG. 4 shows additional details of the selective IPO operation of FIG. 3, in accordance with an embodiment of the present invention.

FIG. 4 shows additional details of the selective IPO operation 206, in accordance with an embodiment of the present invention. As shown in FIG. 4, after placement (see step 202 of FIG. 2), a timing analysis 204 (also labeled as 302) is performed yielding various reports 304 including timing report, RC report, transition violation report, cap violation report, and critical Nets report. In step 306, the reports are read by the parser, for the selective IPO process. In the selective/filter stage, step 308 of FIG. 3, based on user provided criteria such as cell delay, transition time, capacitance violation, inter-connect delay, and wireload value, the paths with the highest timing violation potential are selected first for an In Place Optimization. So, in steps 402 and 404, the various user provided criteria values are compared and used to select the paths and nets with the highest timing violation potential. For example, in step 402, if the tran_time (transition time) is greater than 0.5 or the Cap is violated, then that net is included in the Net File, in operation 406. In step 404, if the wireload is greater than 0.3 and the delay is greater than 0.5, then the net is included in the Net file, in operation 406. FIG. 5E shows an example of a generated Net File including a list of selected critical paths and nets.

In the execution step 408, an internal IPO process is performed on the elements of the Net File that have been selected based on the user defined criteria and values. The selective IPO may include the following procedures:
Optimize fanout
Down size components
Resize components
Upsize components.

Additional operations may be performed by IPO process. FIG. 6 shows an exemplary IPO command file, in accordance with an embodiment of the present invention.

Although the present invention has been described in considerable detail with reference to certain preferred versions thereof, other versions are possible. Therefore, the spirit and scope of the appended claims should not be limited to the description of the preferred versions contained herein.

What is claimed is:

1. A method of resolving timing violations in a network of components and interconnects for a physical design of an integrated circuit, the method comprising:
   performing a timing analysis on the network, one or more components or interconnects of the network, each having a particular amount of timing violation potential; and
   performing a selective in-place optimization by identifying components or interconnects of the network that have the highest amount of timing violation potential and executing an in place optimization according to the identified components or interconnects;
   wherein the step of performing a selective in-place optimization includes:
      obtaining user-provided criteria, the criteria including cell delay, transition times, net cap and interconnect delays;
      generating, in a set of reports, timing, transition, cap violation data, rc information and critical nets for the entire design;
      scanning the generated reports;
      performing logic operations to generate a selection list of selected components or nets or both with the greatest amount of timing violation potential based on the user-provided criteria and removing clock nets from the selection list; and
      performing an in-place optimization with only the selected components on nets or both.

2. The method of claim 1, wherein the selected components or nets with greatest amount of timing violation potential are stored in a Net File.

3. The method of claim 1, wherein the selective in-place optimization process includes at least one of: optimizing fanout, down sizing the components, and up sizing the components.

4. A computer program embodied on computer readable medium for resolving timing violations in a network of components and interconnects for a physical design of an integrated circuit, the computer program comprising:
   code for performing a timing analysis on the network, one or more components or interconnects of the network each having a particular amount of timing violation potential; and
   code for performing a selective in-place optimization by identifying components or interconnects of the network that have the highest amount of timing violation potential and executing an in place optimization according to the identified components or interconnects;
   wherein the step of performing a selective in-place optimization includes:
      code for obtaining user-provided criteria, the criteria including cell delay, transition times, net cap and interconnect delays;
      code for generating, in a set of reports, timing, transition, cap violation data, rc information and critical nets for the entire design;
      code for scanning the generated reports;
      code for performing logic operations to generate a selection list of selected components or nets or both with the greatest amount of timing violation potential based on the user-provided criteria and removing clock nets from the selection list; and
      code for performing an in-place optimization with only the selected components or nets or both.

* * * * *